C. F. HEINIG.
DEMOUNTABLE RIM FOR VEHICLE WHEELS.
APPLICATION FILED AUG. 25, 1913.
1,193,781.  Patented Aug. 8, 1916.
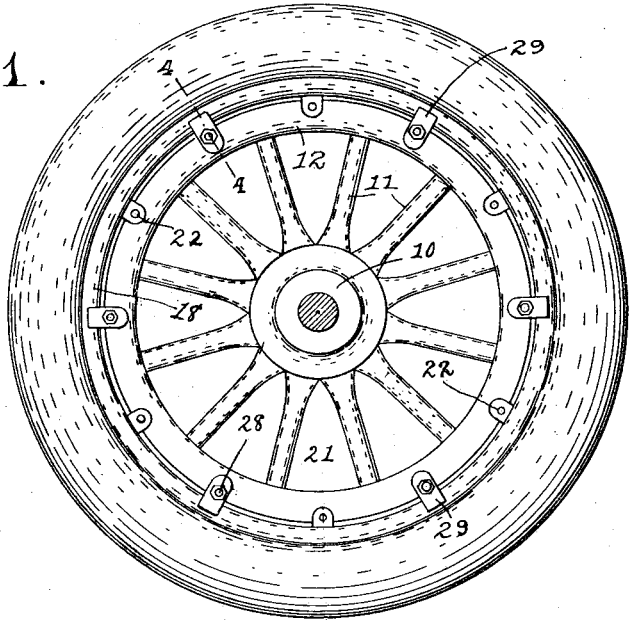
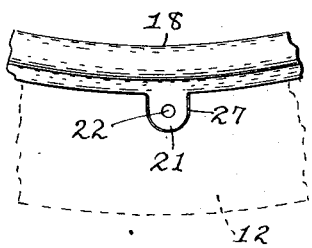
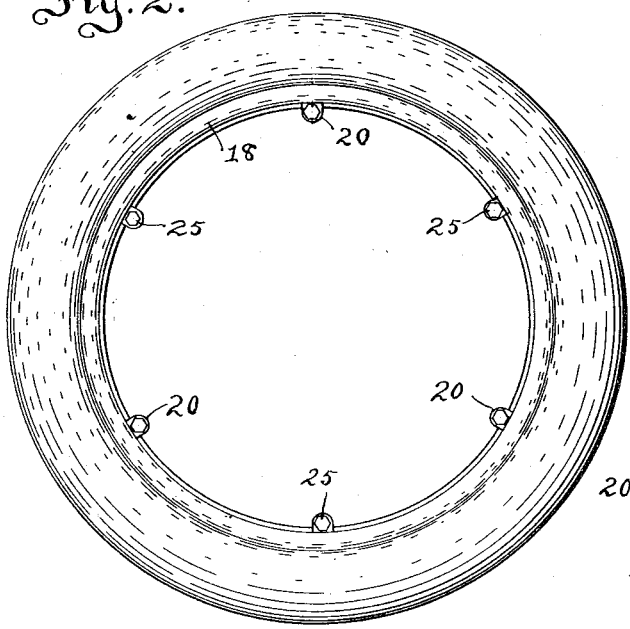
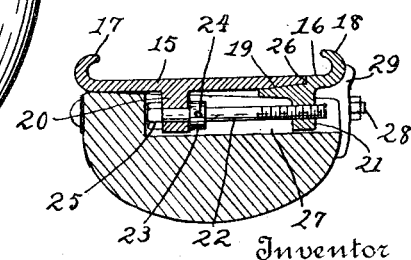
Witnesses
Chas. N. Leonard.
J. A. Braddock.
Inventor
Charles F. Heinig,
By Bradford & Doolittle,
Attorneys

UNITED STATES PATENT OFFICE.

CHARLES F. HEINIG, OF INDIANAPOLIS, INDIANA, ASSIGNOR OF ONE-FOURTH TO MORRIS L. BAUGHAM, OF INDIANAPOLIS, INDIANA.

DEMOUNTABLE RIM FOR VEHICLE-WHEELS.

1,193,781.  Specification of Letters Patent.  Patented Aug. 8, 1916.

Application filed August 25, 1913. Serial No. 786,511.

*To all whom it may concern:*

Be it known that I, CHARLES F. HEINIG, a citizen of the United States, residing at Indianapolis, Marion county, and State of Indiana, have invented and discovered certain new and useful Improvements in Demountable Rims for Vehicle-Wheels, of which the following is a specification.

My said invention consists in an improved construction of demountable rims for vehicle wheels especially intended and adapted for carrying pneumatic tires, whereby such a rim is provided which is rigid in construction and by which the shoe of the tire may be readily and conveniently put in place and removed, all as will be hereinafter more fully described and claimed.

Referring to the accompanying drawings which are made a part hereof and on which similar reference characters indicate similar parts, Figure 1 is a side elevation of an automobile wheel provided with a tire mounted on one of my demountable rims, the rim being in place on the wheel, Fig. 2 a similar view of the demountable rim and tire removed from the wheel, Fig. 3, a detail view on an enlarged scale of a section of the demountable rim and a portion of the wheel rim or felly in dotted lines, showing the connection between the two, and Fig. 4, a details cross section as on the dotted line 4—4 in Fig. 1, the tire being omitted.

In said drawings, I have illustrated a wheel of a common automobile type, consisting of a hub 10, spokes 11, and rim 12.

The demountable rim is composed of two sections 15 and 16, each of which have inturned flanges 17 and 18, respectively, on their outer edges of the usual form for engaging and retaining the shoe. Said sections 15 and 16 when fitted together as shown most clearly in Fig. 4, engage at their adjacent edges by an overlapping or interengaging joint. This joint provides a strong connection for the two sections of the rim tending to resist radial separation of these parts by the pressure of the tire and also serving to guide the parts together when they are engaged. The faces of the respective parts forming such joint, as 19, are preferably tapered so that when the two separate rings are assembled, they will start to slide together easily. The section 15 is formed with a series of bosses 20 and the section 16 with a series of corresponding bosses 21. Said bosses are perforated to receive a transverse bolt 22, the bosses 21 being internally screw-threaded and engaged by the screw threads of said bolts. Said bolts are adapted to rotate freely in the perforation in the bosses 20 and are retained from longitudinal movement in respect to said bosses by means of collars 23 which are mounted on said bolts just inside said bosses 20 and secured by cotter pins 24 or in any other approved manner.

The two parts are assembled by starting the part or ring 16 on over the outer edge of the part 15 engaging the screw-threaded ends of the bolts 22 with the screw threads of the bosses 21 and then turning said bolts 22 by means of a wrench engaging the heads 25 until the parts are drawn together, or until the shoulder 26 of the part 16 abuts the edge of the part 15. The wheel rim 12 is formed with transverse recesses 27 in its exterior surface of a form and at intervals adapted to receive the bosses 20 and 21 and the bolts connecting them. Said recesses extend that distance across the wheel rim necessary to accommodate these parts but, as indicated in Fig. 4, the heads of the bolts 22 are preferably substantially in contact with the inner ends of said recesses when the parts are assembled, thus serving to prevent them from working out and permitting the parts to loosen. The bolts 22 are shorter than the width of the felly and are protected at the ends thereof by the part of the felly forming the inner wall of the recess and by the outer clamping ring.

The demountable rim is mounted upon the wheel rim by being slid thereon in the usual manner and is secured thereon by means of bolts 28 and clips 29, the bolts 28 passing through the rim 12 and the clips 29 engaging the outer edge of the ring 16 in a well known manner.

Having thus fully described my said invention, what I claim as new and desire to secure by Letters Patent, is—

1. In combination with a felly, a rim consisting of two circular tire clamping parts both separable from the felly and having their inner circumferential border portions relatively interfitting and overlapping transversely, radially extending lugs carried by the respective parts and transverse clamping screws being mounted to turn freely in one lug and to engage threads in the other lug and means for fixing said screw against longitudinal movement with respect to one of said lugs.

2. A demountable rim for vehicle wheels consisting of two circular members both separable from the felly, one of said members overlapping the other member along the inner edge portions thereof, opposing bosses arranged at intervals around the circumferences of said members, transverse threaded bolts passing through the bosses on one member and free to turn therein, said bolts having a nut on one side of each of said bosses and a collar preventing longitudinal movement of the bolt on the other side thereof and having threaded ends to engage the opposing member and means to clamp said members to the felly, substantially as described.

In witness whereof, I have hereunto set my hand and seal at Indianapolis, Indiana, this 23rd day of August, A. D. nineteen hundred and thirteen.

CHARLES F. HEINIG. [L. S.]

Witnesses:
E. D. BRADFORD,
A. C. RICE.